(12) United States Patent
Barnes et al.

(10) Patent No.: US 9,869,219 B2
(45) Date of Patent: Jan. 16, 2018

(54) APPARATUS AND METHOD

(71) Applicant: Castrol Limited, Pangbourne, Reading (GB)

(72) Inventors: Andrew Philip Barnes, Norfolk (GB); Peter Stuart Brett, Berkshire (GB); Steven Paul Goodier, Berkshire (GB); Mark O'Malley, Norfolk (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 14/443,618

(22) PCT Filed: Nov. 19, 2013

(86) PCT No.: PCT/EP2013/074203
§ 371 (c)(1),
(2) Date: May 18, 2015

(87) PCT Pub. No.: WO2014/076314
PCT Pub. Date: May 22, 2014

(65) Prior Publication Data
US 2015/0292371 A1     Oct. 15, 2015

(30) Foreign Application Priority Data

Nov. 19, 2012   (EP) .................................. 12193246

(51) Int. Cl.
*F01M 11/03*       (2006.01)
*F01M 1/10*        (2006.01)
(Continued)

(52) U.S. Cl.
CPC ............ *F01M 11/03* (2013.01); *F01M 11/04* (2013.01); *B01D 35/18* (2013.01); *F01M 1/10* (2013.01);
(Continued)

(58) Field of Classification Search
CPC ........ F16N 39/005; F01M 11/03; F01M 1/10; B01D 35/18
(Continued)

(56) References Cited

U.S. PATENT DOCUMENTS 3,399,776 A   9/1968   Knuth
4,151,823 A   5/1979   Grosse et al.
(Continued)

FOREIGN PATENT DOCUMENTS

DE       101 36 971       2/2003
DE       102012024365     6/2014
(Continued)

*Primary Examiner* — Jacob Amick
*Assistant Examiner* — Charles Brauch
(74) *Attorney, Agent, or Firm* — McDonnell Boehnen Hulbert & Berghoff LLP

(57) ABSTRACT

A fluid reservoir system for a vehicle engine, which engine comprises a fluid circulation system, the reservoir system comprising a container for fluid, in which the container comprises at least one fluid inlet port, at least one fluid outlet port and at least one vent port and in which, each of said ports comprises a self-sealing coupling adapted to connect to a corresponding coupling on the vehicle engine to thereby connect said container in fluidic communication with the fluid circulation system of the engine and in which the reservoir system comprises at least one latch which is adapted to retain said container in fluidic communication with said vehicle engine fluid circulation system and is remotely operable to disconnect said container from said vehicle engine fluid circulation system and in which the system comprises at least one actuator which is connected to one or more of said latches and is adapted to operate said one or more latches and said container is elongate; said inlet, outlet and vent ports are located at a common first end of said container; and said at least one actuator is operable at a second end of said container, distal from said ports. Also (Continued)

provided is a method of supplying fluid to a vehicle engine using said fluid reservoir system.

21 Claims, 2 Drawing Sheets

(51) Int. Cl.
  *B01D 35/18* (2006.01)
  *F16N 39/00* (2006.01)
  *F01M 11/04* (2006.01)
  *F01M 11/00* (2006.01)

(52) U.S. Cl.
  CPC ........ *F01M 11/045* (2013.01); *F01M 11/0458* (2013.01); *F01M 2001/1071* (2013.01); *F01M 2011/0083* (2013.01); *F01M 2011/0483* (2013.01); *F16N 39/005* (2013.01)

(58) Field of Classification Search
  USPC ....................................................... 123/196 A
  See application file for complete search history.

(56) References Cited

U.S. PATENT DOCUMENTS

| | | | |
|---|---|---|---|
| 5,454,354 A | 10/1995 | Miller | |
| 5,640,936 A * | 6/1997 | Hudson | F01M 1/12 123/196 A |
| 6,048,454 A | 4/2000 | Jenkins | |
| 6,793,818 B1 | 9/2004 | Entringer et al. | |
| 2005/0161628 A1 | 7/2005 | Tiberghien et al. | |
| 2007/0295008 A1 * | 12/2007 | Shuttleworth | F02B 75/26 60/605.2 |
| 2008/0054006 A1 * | 3/2008 | Yamamoto | B60N 3/102 220/737 |
| 2008/0088127 A1 | 4/2008 | Tiberghien | |
| 2008/0248981 A1 * | 10/2008 | Matsui | C10M 169/04 508/382 |
| 2008/0265574 A1 | 10/2008 | Tiberghien et al. | |
| 2009/0195093 A1 * | 8/2009 | Bandai | B60K 6/365 310/54 |
| 2009/0211552 A1 | 8/2009 | Prior et al. | |
| 2011/0253092 A1 | 10/2011 | Springer et al. | |
| 2015/0291317 A1 | 10/2015 | Brett et al. | |
| 2015/0291318 A1 | 10/2015 | Barnes et al. | |
| 2015/0292372 A1 | 10/2015 | Barnes et al. | |
| 2015/0292674 A1 | 10/2015 | Brett et al. | |

FOREIGN PATENT DOCUMENTS

| | | |
|---|---|---|
| WO | WO 01/53663 | 7/2001 |
| WO | WO 2016/158971 | 10/2016 |

* cited by examiner

APPARATUS AND METHOD

This application is the U.S. National Phase of International Application No. PCT/EP2013/074203 filed Nov. 19, 2013 which designated the U.S. and claims priority to European Patent Application No. 12193246.1 filed Nov. 19, 2012, which is hereby incorporated by reference in its entirety.

This invention relates to an apparatus and method and in particular to a fluid reservoir system for a vehicle engine and a method of supplying fluid to a vehicle engine.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine and may require periodic replacement.

Conventional periodic replacement of engine lubricating oil composition in a vehicle engine usually involves draining the composition from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil composition.

U.S. Pat. No. 4,151,823 relates to a quick-change oil filter/reservoir system for an internal combustion engine having a primary oil pump and oil sump comprising a cartridge containing an oil filter element and supply of oil, said cartridge having non-manipulative and self-sealing input and out-put fittings; a cartridge mounting for releasably carrying said cartridge, said cartridge including input and out-put oil pipes corresponding to and engageable by said input and output fittings, respectively; scavenger pump means for continuously returning oil from said sump to said input oil pipe; and means connecting said output pipe to the input of said primary oil pump. In one embodiment shown in FIG. 1 of U.S. Pat. No. 4,151,823, and described at col. 3 lines 22 to 30, the cartridge is said to be retained on the mounting plate by conventional quick release mountings. It is stated that for example, the cartridge may be provided with a plurality of outward extending tabs which are engaged with spring clips carried on the mounting plate. It is stated at col. 4 lines 13 to 20 in U.S. Pat. No. 4,151,823 in respect of this embodiment that the top of the cartridge is provided with a breather cap to discharge gases received in the cartridge. It is stated that such gases are preferably returned to the emission control system of the engine through a breather hose. It is also stated that the breather cap may include a downwardly depending dip stick which may be employed to measure the oil level in the cartridge and thus the oil level of the engine.

The tabs and spring clips shown in the embodiment of FIG. 1 of U.S. Pat. No. 4,151,823 are on the end of the cartridge bearing the inlet and outlet ports and so are in a position remote from the top of the engine. Thus, these may be difficult to access. Furthermore, such spring clips might require a tool to disengage them. Such clips might also require a means for holding the clips out of engagement when the cartridge is being removed. It might be difficult to access the clips to manually hold them in a disengaged position when removing the cartridge. The breather cap in this embodiment is shown with a pipe which would need to be separately connected to and disconnected from the cap. This requires an additional step in the process of removing and replacing the cartridge.

U.S. Pat. No. 5,454,354 relates to a combined oil filter/reservoir cartridge for an internal combustion engine mounted outboard of the engine for easy access. The device includes an oil filter and has sufficient capacity to hold all of the engine oil. An auxiliary pump is included to pump fresh oil from a new device into the engine and to pump the old oil into the reservoir. The device can then be demounted and the contents and cartridge recycled. It is stated that the inlet and outlet ports of the cartridge connect to the oil distribution system by quick disconnect members so that the cartridge can be easily disconnected from the system. According to the illustrated example, inlet hose 12 attaches to the cartridge 10, preferably near the centre of the top surface of cartridge 10, with quick connect inlet adapter 14 (col. 3 lines 47 to 49). Also according to the illustrated example, outlet pipe 28 extends into reservoir 24 and connects to cartridge 10 at the top of the cartridge in conjunction with outlet hose 32. Outlet hose 32 is said to connect to cartridge 10 using quick connect outlet adapter 30 (col. 3 lines 58 to 62).

U.S. Pat. No. 5,640,936 relates to a removable oil tank and oil filter for four cycle dry sump internal combustion engines having particular utility in marine engines. Claim 4 of this patent states:

In a dry setup internal combustion engine having an engine block, piston, crank shaft, crankcase, crank case cover, and a lubricating oil system comprising an oil pump and an oil scavenging pump, an improvement comprising an oil reservoir which may be disconnected and removed from the engine comprising:

an oil tank separate from the engine;

a first oil line interconnecting the oil scavenging pump and the oil tank;

a second oil line interconnecting the oil pump and the tank;

a vent line interconnecting the tank and the crank case; fluid quick disconnect means for interconnecting each of the first and second oil lines and the vent line and the oil tank, wherein each of the quick disconnect means closes upon disconnect so that the oil will not leak from the oil tank when the oil and vent lines are disconnected and the tank is removed from the engine; and means for supporting the bottom of the tank when attached to the engine comprising a horizontal bracket and means for attaching the bracket to one of the crank case cover and the engine block and wherein quick disconnect means for the first and second oil lines and vent lines comprise female fittings extending through the bottom of the tank, and male fittings extending through the support bracket, so that the oil and vent lines all connect to the bottom of the tank.

In the illustrated example, the connectors are shown at the base of the oil tank which might present problems of accessibility.

WO 01/53663 relates to a removable and disposable oil cartridge device linked to an internal combustion engine regulating interface for manually filling or emptying and automatically regulating the engine lubricating oil, wherein the interface comprises a system of controlled valves in which the controlled valve system provides a configuration of specific circuits for each of the requirements for the proper running of the engine (lack of oil, stable running conditions, oil overflow) and the proper filling or emptying when the cartridge is manually changed.

According to this document at page 29, it is said to be possible to completely drain the engine by replacing the cartridge as follows: The engine is stopped and also the pump. Starting to withdraw the cartridge increases its volume and aspirates the oil from the casing into the cartridge. The detector detects a fall in the oil level in the casing and acts normally on the interface/regulator to put the system into filling mode and open the two valves and Y. However the pump does not function (the motor is stopped). Continued traction effort on part 4a of the cartridge continues aspiration which occurs through two pipes H1 and H2. When in the expanded state, the volume of the cartridge is calculated so that its aspirated volume is at least equal to the total volume of the engine oil, including any residual oil in the interface regulator. When the traction effort and sliding motion is completed, draining is thus complete; no waste oil remains in the driving circuit and the interface/oil supply/pipe. The cartridge is then withdrawn from its support which disconnects the pipes H1 and H2, the whole of the parts being adapted so that no volume of oil can escape from the cartridge at this time. This stage is said not to be illustrated.

According to WO 2001/53663 by reference to FIG. 26 it is stated at page 30 that: A new cartridge full of oil is in the expanded state. One positions the new cartridge without support on the fixing support (50a) and as soon as one then starts to press on the cartridge one engages this in guidance in the locking devices (50a) and possibly in other latching, snapping etc. systems, not represented and which are alleged to be within the range of the expert, which perforates simultaneously the seal-tight cap of the initially-sealed full cartridge, it is stated in WO 01/53663 that the cover can be elaborated in a known adequate material. It is also stated that in a preferred but non-restrictive embodiment of the device, the upper part of the pipes H1 and H2 are cut in a bevel to facilitate the introduction of the cartridge.

WO 2001/53663 does not describe how the pipes H1 and H2 are disconnected.

There remains a need for a fluid reservoir system for a vehicle engine which overcomes or at least mitigates these or other problems.

Thus, according to the present invention there is provided a fluid reservoir system for a vehicle engine, which engine comprises a fluid circulation system, the reservoir system comprising a container for fluid, in which the container comprises at least one fluid inlet port, at least one fluid outlet port and at least one vent port and in which, each of said ports comprises a self-sealing coupling adapted to connect to a corresponding coupling on the vehicle engine to thereby connect said container in fluidic communication with the fluid circulation system of the engine and in which the reservoir system comprises at least one latch which is adapted to retain said container in fluidic communication with said vehicle engine fluid circulation system and is remotely operable to disconnect said container from said vehicle engine fluid circulation system and in which the system comprises at least one actuator which is connected to one or more of said latches and is adapted to operate said one or more latches and said container is elongate; said inlet, outlet and vent ports are located at a common first end of said container; and said at least one actuator is operable at a second end of said container, distal from said ports.

The present invention can therefore at least mitigate problems identified by providing a fluid reservoir system which comprises at least one latch which is adapted to retain the container in fluidic communication with the vehicle engine fluid circulation system and which is remotely operable to disconnect the container from the vehicle engine fluid circulation system and in which the system comprises at least one actuator which is connected to one or more of said latches and is adapted to operate said one or more latches and said container is elongate; said inlet, outlet and vent ports are located at a common first end of said container; and said at least one actuator is operable at a second end of said container, distal from said ports.

The latch may be separate from the self-sealing couplings. Thus, the at least one latch may be separate from said self-sealing couplings; biased to a locking position to thereby retain the container in fluidic communication with the vehicle engine fluid circulation system and remotely operable to disconnect the container from the vehicle engine fluid circulation system.

The self-sealing couplings may comprise at least one of the latches. Thus, one or more of the self-sealing couplings may comprise at least one of the latches which is biased to a locking position to thereby retain the container in fluidic communication with the vehicle engine fluid circulation system and is remotely operable to disconnect the container from the vehicle engine fluid circulation system, in addition, the system may further comprise at least one further latch which is separate from the self-sealing couplings. Thus, in this embodiment, the system may further comprise at least one further latch which is separate from the self-sealing couplings; is biased to a locking position to thereby retain the container in fluidic communication with the vehicle engine fluid circulation system and is remotely operable to disconnect the container from said vehicle engine fluid circulation system Each latch is adapted to retain the container in fluidic communication with the vehicle engine fluid circulation system and is remotely operable to disconnect the container from the vehicle engine fluid circulation system.

In general, self-sealing couplings have the characteristic that when the coupling is being connected, a seal is made between the connecting ports before valve or valves open to allow fluid to flow. On disconnection, the valve or valves close to seal off each of the ports before the coupling seal between the ports is broken.

The self-sealing couplings of the system may provide a "dry break" in which no fluid flows on connection or disconnection of the coupling. Alternatively, the self-sealing couplings of the system may provide a "damp break" in which there is flow of only a non-essential amount of fluid, for example a few drips of liquid, on disconnection or connection of the coupling.

Suitable self-sealing couplings of the system include rallye raid SPT12 couplings available from Stäubli. Other suitable types of self-sealing coupling are described in US 2005/0161628, US2008/0265574 and US2008/0088127.

Each of the self-sealing couplings may comprise a latch which is biased to a locking position to thereby retain the container in fluidic communication with the vehicle engine fluid circulation system and which is remotely operable to disconnect the container from the vehicle engine fluid circulation system. The latches are biased to a locking position. This has an advantage that when the system is positioned to connect it to the engine, the latches engage the corresponding ports on the engine and retain the container in fluidic communication with the fluid circulation system of the engine.

The self-sealing couplings may also retain the container on the vehicle. The self-sealing couplings may also retain the container on the engine. The self-sealing couplings may also retain the container on a manifold which is in fluidic communication with the fluid circulation system of the engine.

The system further comprises at least one actuator which is connected to one or more of the latches and is adapted to operate the one or more latches.

The container is elongate with the inlet, outlet and vent ports being located at a common first end of the container and the at least one actuator being operable at a second end of the container, distal from said ports.

The at least one actuator may comprise an elongate actuator member which comprises first and second ends and extends between the first and second ends of the container; and one or more of the latches comprises a collar which is operably connected to the first end of the elongate actuator member by a transverse actuator member. The system may comprise a single elongate actuator member extending between the first and second ends of the container; all of the latches comprising a collar; and all of the collars being operably connected to the first end of the elongate actuator member by a transverse actuator member.

The actuator may comprise a lever for operating the actuator. Suitably, the system may comprise a handle for carrying the system and the lever may be pivotably or slideably mounted on the handle. This may have an advantage that the container may be disconnected from the engine fluid circulation system and the system lifted out of the vehicle with one hand of an operator; the replacement system also being positioned and re-connected by an operator using one hand.

The actuator may comprise a first handle which may suitably be located adjacent a second handle for carrying the system, such that an operator may hold both handles and urge them together thereby actuating the actuator. This may have an advantage that the container may be disconnected from the engine fluid circulation system and the system lifted out of the vehicle with one hand of an operator; the replacement system also being positioned and re-connected by an operator using one hand.

The actuator may comprise at least one electromagnetic member adapted to operate at least one of the latches. The actuator may comprise at least one electromagnetic member adapted to operate all of the latches. Suitable electromagnetic members may comprise a solenoid which comprises a central core which is a push or pull rod which may be magnetically actuated.

Interlocks may be provided to prevent the engine from operating if the container is disconnected from the engine fluid circulation system and/or to prevent the container being disconnected from the engine if the engine is operating.

At least one of the ports may comprise a non-return valve. Suitably, the at least one outlet port comprises a non-return valve. If the container comprises more than one outlet port, suitably each outlet port comprises a non-return valve. The non-return valve in the outlet may prevent fluid from draining back to the container when the engine is not operating and may help keep a fluid line to a circulating pump full of fluid so that circulation of fluid is immediate when operation of the engine is started. The fluid inlet port or ports may each comprise, a control valve or shut-off valve which may be closed when the vehicle engine is not operating, for example to prevent or reduce fluid draining from the container to the engine.

The vent port or vent ports may not contain any valves because fluid, for example gas and/or vapour, may be required to flow both to and from the container through the vent port or vent ports when the container is connected to the vehicle engine fluid circulation system.

Suitably, the corresponding ports on the vehicle engine are self-sealing ports. This has an advantage that when the container has been disconnected from the engine, the risk of ingress of contaminants into the engine may be mitigated.

The container may comprise a filter for filtering the fluid. This is suitable when the fluid is an engine lubricating oil composition.

Suitable filters may comprise paper and/or metal filter elements. The filter may be suitable for filtering particles in the range 1 to 100 microns, suitably in the range 2 to 50 microns, for example in the range 3 to 20 microns. The filter may comprise a filter by pass for fluid to bypass the filter, for example if the filter becomes blocked or unacceptably loaded with material, which may cause an unacceptable fluid back-pressure through the filter. An advantage of having a filter in the container is that this may allow a larger filter to be used than if the filter were in a separate container associated with the engine fluid circulation system. This may have one or more of the following benefits: (a) increased filtration efficiency; (b) finer filtration and (c) increased filter lifetime.

Suitably, in use, fluid enters the container through the inlet port and is passed to the top of the container, for example through at least one conduit in the container; some or all of the fluid is passed through a filter on exiting said conduit; and the totally or partially filtered fluid is withdrawn from the base of the container through the outlet port The filter may operate at elevate pressure.

The container may be manufactured from metal and/or plastics material. Suitable materials include reinforced thermoplastics material which for example, may be suitable for operation at temperatures of up to 150° C., for extended periods of time.

The container may comprise at least one trade mark, logo, product information, advertising information, other distinguishing feature or combination thereof. The container may be printed and/or labelled with at least one trade mark, logo, product information, advertising information, other distinguishing feature or combination thereof. This may have an advantage of deterring counterfeiting. The container may be of a single colour or multi-coloured. The trademark, logo or other distinguishing feature may of the same colour and/or material as the rest of the container or a different colour and/or material as the rest of the container.

The container may be a container for a fluid which is a liquid. Suitable liquids include engine lubricating oil composition and heat exchange fluid for an electric engine.

The container may be a container for engine lubricating oil composition. Thus, the container may contain engine lubricating oil composition, in this embodiment, the system may be provided as a self-contained system containing fresh, refreshed or unused lubricating oil composition which may conveniently replace a container on an engine containing used or spent lubricating oil composition. If the container also comprises a filter, this also is replaced together with the spent or used lubricating oil composition. Thus, a fluid reservoir system containing spent or used lubricating oil composition retained in fluidic communication with a vehicle engine fluid circulation system may be disconnected from the vehicle engine fluid circulation system by remotely operating the self-sealing couplings for the inlet, outlet and vent ports. The system may be removed from the vehicle and replaced by a system containing fresh, refreshed or unused lubricating oil composition and if present a fresh, renewed or new filter.

The engine lubricating oil composition may comprise of at least one base stock and at least one engine lubricating oil additive. Suitable base stocks include bio-derived base stocks, mineral oil derived base stocks, synthetic base stocks and semi synthetic base stocks. Suitable engine lubricating oil additives are known in the art. The additives may be organic and/or inorganic compounds. Typically, the engine lubricating oil composition may comprise about 60 to 90% by weight in total of base stocks and about 40 to 10% by weight additives. The engine lubricating oil composition may be a lubricating oil composition for an internal combustion engine. The engine lubricating oil composition may be a mono-viscosity grade or a multi-viscosity grade engine lubricating oil composition. The engine lubricating oil composition may be a single purpose lubricating oil composition or a multi-purpose lubricating oil composition.

The engine lubricating oil composition may be a lubricating oil composition for an internal combustion engine. The engine lubricating oil composition may be a lubricating oil composition for a spark ignition internal combustion engine. The engine lubricating oil composition may be a lubricating oil composition for a compression internal combustion engine.

The container may be a container for heat exchange fluid for an electric engine. Thus, the container may contain heat exchange fluid for an electric engine. In this embodiment, the system may be provided as a self-contained system containing fresh, refreshed or unused heat exchange fluid for an electric engine which may conveniently replace a system on an engine containing used or spent heat exchange fluid. If the container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The fluid reservoir system may provide a heat storage system in which heat exchange fluid may he stored for use to heat the electric engine when required. The fluid reservoir system may provide a system for storage of coolant at a temperature below the operating temperature of the engine for use to cool the electric engine when required.

Suitable heat exchange fluids for electric engines may be aqueous or non-aqueous fluids. Suitable heat exchange fluids for electric engines may comprise organic and/or non-organic performance boosting additives. Suitable heat exchange fluids may be man-made or bio-derived, for example Betaine. The heat exchange fluids may have fire retarding characteristics and/or hydraulic characteristics. Suitable heat exchange fluids include phase change fluids. Suitable heat exchange fluids include molten metals or salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

The container may be suitable for operating at temperatures of from ambient temperature up to 200° C., suitably from −20° C. to 180° C., for example from −10° C. to 150° C.

The container may be suitable for operating at pressures up to 15 barg, suitably from −0.5 barg to 10 barg, for example from 0 barg to 8 barg.

Suitable vehicles include motorcycles, earthmoving vehicles, mining vehicles, heavy duty vehicles and passenger cars.

The fluid reservoir system is advantageous where rapid replacement of the fluid is required or advantageous, for example in "off-road" and or "in field" services.

According to a further embodiment there is provided a fluid reservoir system as herein described in communication with the fluid circulation system of a vehicle engine. The vehicle engine may be an internal combustion engine. Suitable internal combustion engines include spark ignition internal combustion engines and compression ignition internal combustion engines. The vehicle engine may be an electric engine.

The corresponding ports on the vehicle engine may be self-sealing ports.

According to a farther embodiment, there is provided a method of supplying fluid to a vehicle engine comprising a fluid circulation system, which method comprises connecting to said fluid circulation system, a fluid reservoir system as herein described, in which the container contains fluid as herein described.

BRIEF DESCRIPTION OF THE DRAWINGS

The invention will now be described by way of example only by reference to the following drawings in which.

DETAILED DESCRIPTION

Figure 1:
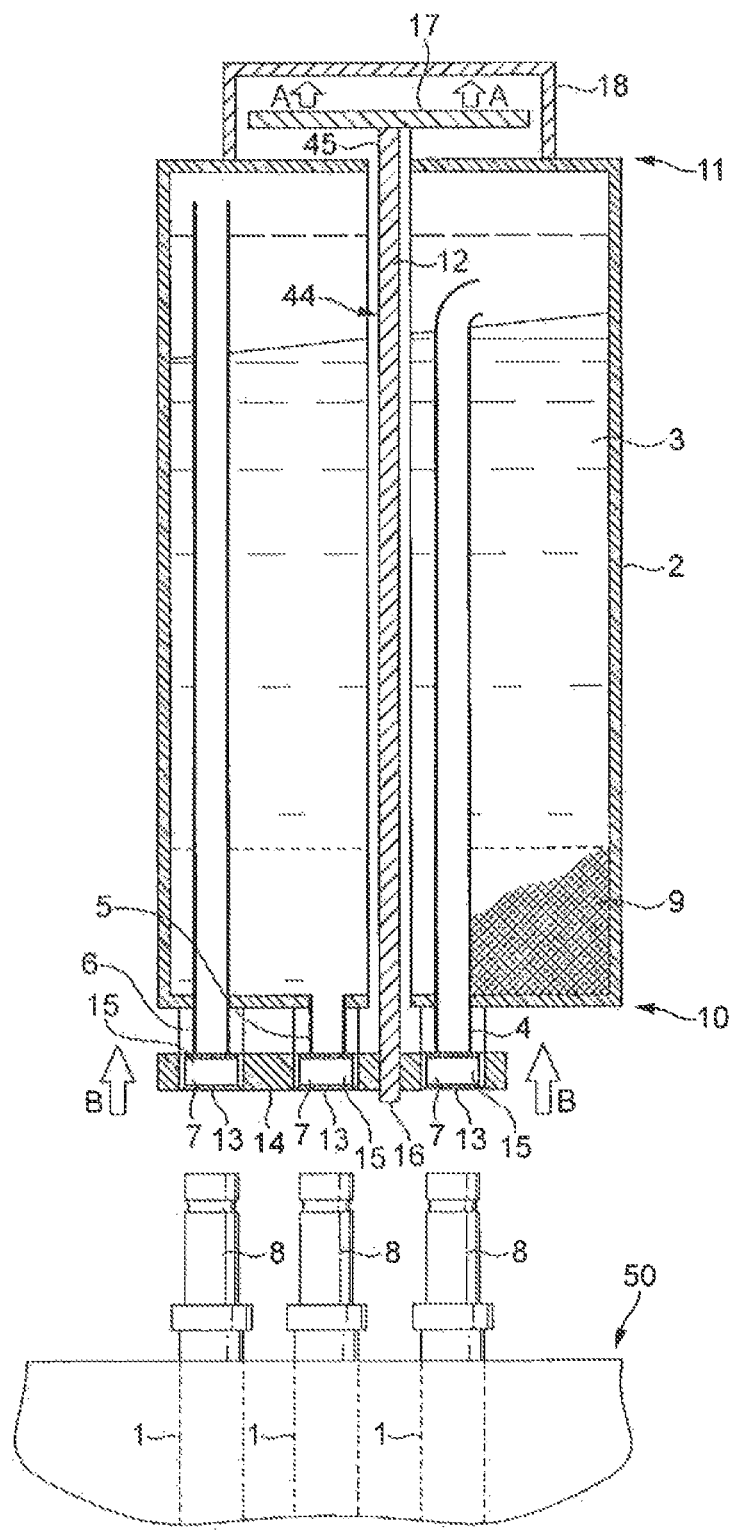
FIG. 1 represents in schematic part cross-section, the system of the present invention with a container disconnected from couplings on a vehicle engine

In FIG. 1 a fluid reservoir system for a vehicle engine (50) which engine comprises a fluid circulation system (1), the fluid reservoir system comprising a container (2) for fluid (3). The fluid may be an engine lubricating oil composition or an engine heat exchange fluid. Suitably, in some embodiments, the fluid (3) is an engine lubricating oil composition. The container may comprise a filter shown in part in FIG. 1 as (9). The container (2) is elongate and comprises a first end (10) and a second end (11).

The container (2) comprises at the first end (10), at least one fluid outlet port (4), at least one fluid inlet port (5) and at least one vent port (6) in which, each of said ports comprises self-sealing couplings (7) adapted to connect to corresponding couplings (8) on the vehicle engine to thereby connect said container (2) in fluidic communication with, the engine fluid circulation system (1).

Each of said self-sealing couplings (7) comprises a latch (13) which is biased to a locking position to thereby retain said container (2) in fluidic communication with said vehicle engine fluid circulation system (1). Each of said self-sealing couplings is remotely operable to disconnect said container from said vehicle engine circulation system (1). Thus, the system comprises an actuator (44) which is connected to said latches (13) and is adapted to operate said latches. The actuator (44) comprises an elongate actuator member (12) comprising a first end (16) and a second end (45) and extending between the first end (10) and the second end (11) of the container (2). Each latch comprises a collar (15) associated with each of said latches biased in a locking position and connected to the common first end (16) of the elongate actuator member (12) of the actuator (44) by a transverse actuator member (14).

The actuator (44) is operable by a handle (17) at the second end (45) of the elongate actuator member (12) distal from the ports (4) (5) (6). Thus movement of the elongate actuator member (12) of the actuator (44) by pulling on the handle (17) in the direction shown generally as A, causes the elongate actuator member of the actuator to act through the transverse actuator member (14) on each of the latch collars (15) thereby to operate each of said latches and disconnect the container from the engine fluid circulation system (1). The reservoir system may then be removed away from the engine in the direction shown generally as (B). The container may comprise a second handle (18) adjacent the handle (17) such that an operator may hold both handles and urge them together thereby actuating the actuator. Alternatively, the handle (17) may be pivotally or slideably mounted on the second handle (18) as a lever for operating the actuator.

After the disconnected system has been removed from the engine and vehicle, another container which may contain fresh, refreshed or unused fluid may be reconnected to the couplings. Thus, pressing this replacement system in the opposite direction to the direction of disconnection causes the self-sealing couplings to engage and retain the container on the engine.

In use, the container is retained in fluidic communication with the vehicle engine fluid recirculation system by the self-sealing couplings. The couplings comprise latches which are remotely operable so that the container may be disconnected from the engine. In this embodiment, operating of the actuator by using the handle (17) enables the latches to be operated remotely and the container to be disconnected from the vehicle engine fluid recirculation system. This may have an advantage that the container may be disconnected from the engine fluid recirculation system and the reservoir system lifted out of the vehicle with one hand of an operator; the replacement system may also be positioned and re-connected by an operator using one hand.

Figure 2:
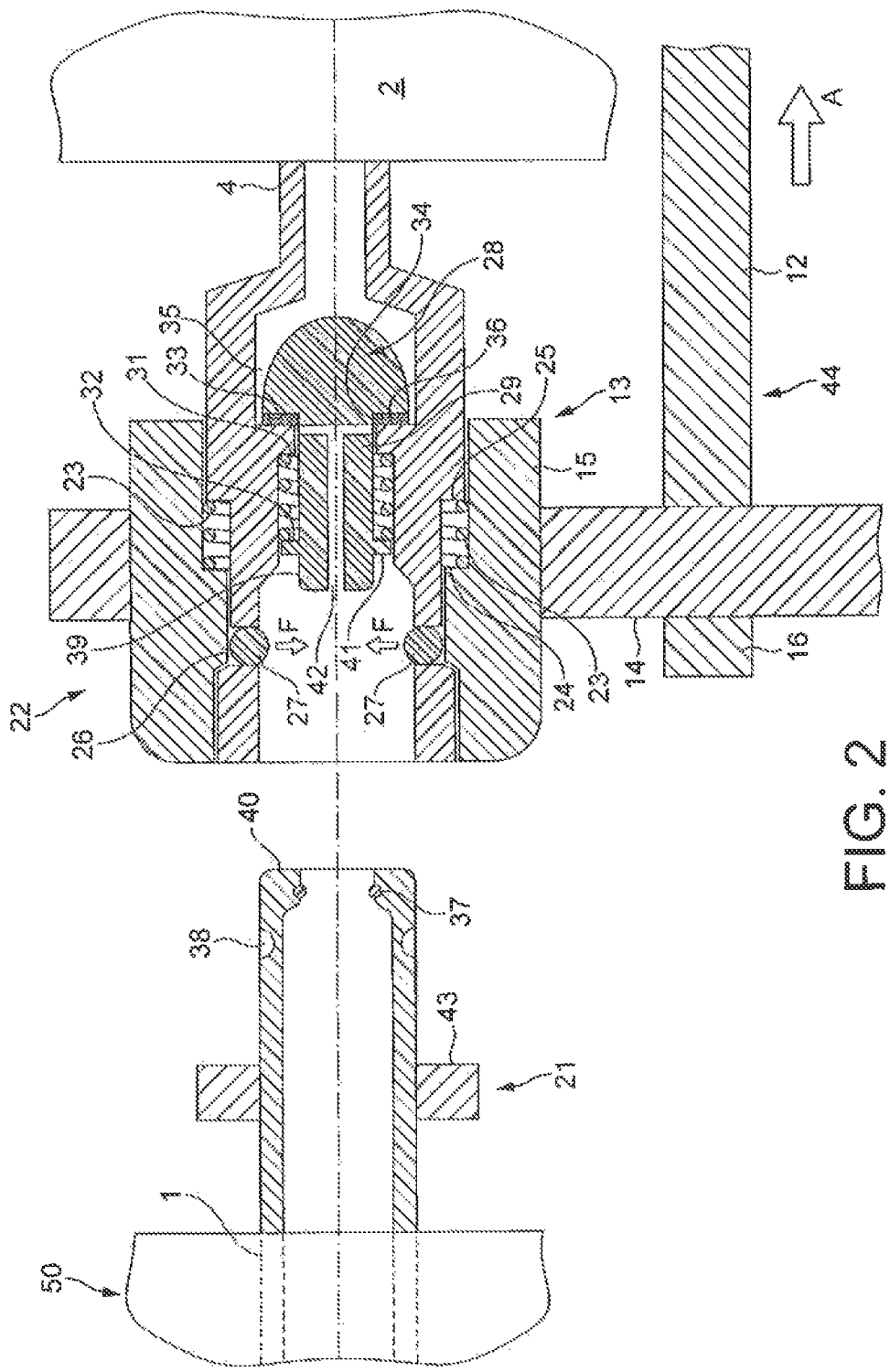
FIG. 2 represents in schematic cross-section, a self-sealing coupling comprising a latch which is suitable for use in the present invention. Common features are identified by common reference numerals.

FIG. 2 shows in schematic longitudinal cross-section a self-scaling coupling comprising a latch suitable for use in a system of the present invention.

The coupling comprises a male element (21) and a female element (22). The female element may be part of a port, for example an inlet port (4) (as shown) or alternatively an outlet port (5) (not shown) or a vent port (6) (not shown) on a container (2). The coupling comprises a remotely operable latch (13) comprising a collar (15) biased in a locking position as shown. The collar (15) is connected to a first end (16) of an elongate actuator member (12) of an actuator (44) by a transverse actuator member (14).

Collars of other couplings (not shown) may also be connected to the transverse member (14).

The latch (13) is biased to a locking position by action of a spring (23) acting against a face (24) on the collar (15) and against a face (25) on the port (4) (which may alternatively be port (5) or port (6)).

The collar has a surface (26) which exerts a radial force in the direction F on balls 27) when in the biased locking position.

The coupling comprises a self-sealing valve (28) which is biased to a dosed position when the male and female elements are disconnected, as shown in FIG. 2. The valve comprises an axially moveable element (29) which is biased to a closed position by the action of a spring (30) acting against a face (31) on the port (4) (which may alternatively be port (5) or port (6)) and a face (32) on the axially moveable element (29). When in the closed position, a valve face (33) of the axially moveable element (29) bears against a valve seat (34) of the port (4) to seal the passage (35) to prevent fluid flow through the valve. One or either or both of the valve face and valve seat may comprise a seal (36).

The male element (21) is in fluidic communication with the vehicle engine fluid circulation system (1) of the engine (50) and comprises a sealing element (37), for example an 'O' ring. The male element comprises an indent (38) which may be in the form of an external groove for receiving the balls (27) when engaged with the female member (22).

As the mate element is inserted into the female element, the sealing element (37) engages the circumferential face (39) of the axially moveable valve element (29). This sealably engages the male and female elements before the valve allows any fluid to flow.

As the male element is inserted further into the female element an end (40) of the male element engages a flange (41) (suitably, circumferential) on the axially moveable valve element and further insertion of the male element causes the male element acting through the male element end (40) and the flange (41) to displace the axially moveable valve element (29) against the action of the biasing spring (30) and displace the valve face (33) from the valve seat (34) allowing fluid to flow through the passage (35) and through the duct (42) in the axially moveable valve element (29).

Thus, the self-sealing valve has the characteristic that when the coupling is being connected, a seal is made between the connecting ports before any valves open to allow fluid to flow.

As the male element (21) is inserted still further into the female element, the male member acts upon the balls (27) in the opposite direction to F until it is sufficiently positioned inside the female element for the balls (27) to engage the indent (38). This latches the male and female members together and retains the container in fluidic communication with the vehicle engine fluid recirculation systems (1) of the engine (50). Positioning of the male and female members may be assisted by flange (43) on the male member.

In use to disconnect the male and female member the elongate actuator member (12) is operated in the direction A and, through the transverse actuator member (14), axially displaces the collar (15) of the latch (13) away from the male member (21). This axially displaces the surface (26) so that it no longer acts to urge the balls (27) in the radial direction F. The balls are free to move out of the indent (38) of the male member and thereby unlatch the male member. The system can now be removed and the container disconnected from the vehicle engine fluid recirculation system. Thus, displacement of the female element (22) in the direction A disengages the balls (27) from the recess (38). Further displacement of the female element (22) in the direction A allows the axially moveable valve member (29) under the action of the spring (30) to be displaced and urge the valve face (33) against the face seat (34) thereby preventing flow of fluid through the passage (35) and duct (42). This seals the valve before the male and female elements are disconnected and in particular, before the seal (37) of the male member (21) disengages the circumferential surface (39) of the axially moveable valve member (29).

The system may then be removed from the vehicle (not shown).

After the disconnected reservoir system has been removed from the engine and vehicle, another reservoir system comprising a container which may contain fresh, refreshed or unused fluid may be reconnected to the couplings. Thus, pressing this replacement system in the opposite direction to the direction of disconnection causes the self-sealing couplings to engage and retain the container in fluidic communication with the vehicle engine fluid recirculation system.

While aspects of the invention have been described in relation to vehicle engines and examples of the invention described the use of engine lubricating oil compositions, it is envisaged that features of the invention could find other applications.

For example, a fluid reservoir system according to an aspect of the invention could be used in relation to a wide range of apparatus or equipment. For example, the fluid reservoir system could find application in relation to various static and movable machines, for example industrial machines such as a lathe, or manufacture and assembly equipment, to an engine, or to a vehicle.

Examples of a fluid reservoir of an aspect of the invention could thus be used to supply lubricant composition to a region of the apparatus or equipment, for example to a region including one or more moving parts, for example a gearbox. In an example of an aspect of the invention there is provided a fluid reservoir for a wind turbine, for example to provide lubricating composition to one or more parts of the wind turbine apparatus.

The reservoir may supply a lubricant composition to the apparatus, or may supply fluid other than lubricant to the apparatus. For example, the fluid may comprise a fuel composition, for example gasoline or diesel The reservoir of an aspect of the invention may be for supply the fluid for example to the fuel supply system of the apparatus. For example, the reservoir may supply fuel to a vehicle, or tool, for example to a car, motorcycle or lawn mower.

In another example, the reservoir is used to supply a fluid, for example lubricant and/or fuel, to a hand tool, for example a hedge trimmer or leaf blower.

The fluid may comprise for example an aqueous or other solvent-based composition, for example a cleaning composition. The fluid may for example comprise windscreen wash fluid. A reservoir of an example of an aspect of the invention may be for supplying fluid to the windscreen washer fluid delivery system for example of a vehicle.

Thus in some examples of aspects of the invention the fluid system may or may not comprise a fluid circulation system.

An aspect of the invention provides a fluid reservoir system for an apparatus. Which apparatus comprises a fluid system, the reservoir system comprising a container for fluid, in which the container comprises at least one fluid port, and in which, said port comprises a self-sealing coupling adapted to connect to a corresponding coupling on the apparatus to thereby connect said container in fluidic communication with the fluid system of the apparatus and in which the reservoir system comprises at least one latch which is adapted to retain said container in fluidic communication with said apparatus fluid system and is remotely operable to disconnect said container from said apparatus fluid system and in which the system comprises at least one actuator which is connected to one or more of said latches and is adapted to operate said one or more latches and said container is elongate; said port is located at a first end of said container; and said at least one actuator is operable at a second end of said container distal from said port.

The invention claimed is:

1. A fluid reservoir system for a vehicle engine, which the engine comprises a fluid circulation system, the reservoir system comprising a container for fluid, in which the container comprises at least one fluid inlet port, at least one fluid outlet port and at least one vent port and in which, each of said ports comprises a self-sealing coupling that connects to a corresponding coupling on the vehicle engine to thereby connect said container in fluidic communication with the fluid circulation system of the engine and in which the reservoir system comprises one or more latches that retains said container in fluidic communication with said vehicle engine fluid circulation system and is remotely operable to disconnect said container from said vehicle engine fluid circulation system and in which the reservoir system comprises at least one actuator which is connected to said one or more latches and that operates said one or more latches; said container is elongate; said inlet, outlet and vent ports are located at a common first end of said container; and said at least one actuator is operable at a second end of said container, distal from said ports.

2. A fluid reservoir system as claimed in claim 1 in which said one or more latches is separate from said self-sealing couplings; is biased to a locking position to thereby retain said container in fluidic communication with said vehicle engine fluid circulation system and is remotely operable to disconnect said container from said vehicle engine fluid circulation system.

3. A fluid reservoir system as claimed in claim 1 in which said self-sealing couplings comprise at least one latch of said one or more latches which is biased to a locking position to thereby retain said container in fluidic communication with said vehicle engine fluid circulation system and is remotely operable to disconnect said container from said vehicle engine fluid circulation system.

4. A fluid reservoir system as claimed in claim 3 which further comprises at least one further latch which is separate from said self-sealing couplings; is biased to a locking position to thereby retain said container in fluidic communication with said vehicle engine fluid circulating system and is remotely operable to disconnect said container from said vehicle engine fluid circulation system.

5. A fluid reservoir system as claimed in claim 1 in which said at least one actuator comprises an elongate actuator member which comprises first and second ends and extends between said first and second ends of said container; and said one or more latches comprises a collar which is operably connected to said first end of said elongate actuator member by a transverse actuator member.

6. A fluid reservoir system as claimed in claim 5 in which said at least one actuator comprises a single elongate actuator member extending from said first end of said container to said second end of said container; all of said one or more latches comprise a collar; and all of said collars are operably connected to said first end of said single elongate actuator member by a transverse actuator member.

7. A fluid reservoir system as claimed in claim 5 in which said actuator comprises a lever for operating said actuator, where the reservoir system comprises a handle for carrying the system and the lever is pivotably or slideably mounted on the handle.

8. A fluid reservoir system as claimed in claim 1 in which said actuator comprises at least one electromagnetic member that operates at least one latch of said one or more latches.

9. A fluid reservoir system as claimed in claim 1 in which said container comprises a filter for filtering fluid.

10. A fluid reservoir system as claimed in claim 1 in which at least one of said ports comprises a non-return valve.

11. A fluid reservoir system as claimed in claim 10 in which said at least one fluid outlet port comprises a non-return valve.

12. A fluid reservoir system as claimed in claim 1 in which said container contains engine lubricating oil composition.

13. A fluid reservoir system as claimed in claim 12 in which said engine lubricating oil composition is a lubricating oil composition for an internal combustion engine.

14. A fluid reservoir system as claimed in claim 12 in which the engine lubricating oil composition is a lubricating oil composition for an electric engine.

15. A fluid reservoir system as claimed in claim 1 in which said container contains a heat exchange fluid for an electric engine.

16. A fluid reservoir system as claimed in claim 1 when said container is in fluidic communication with the fluid circulation system of a vehicle engine.

17. A fluid reservoir system as claimed in claim 16 in which said corresponding ports on said vehicle engine are self-sealing ports.

18. A method of supplying fluid to a vehicle engine comprising a fluid circulation system, which method comprises connecting to said fluid circulation system, a fluid reservoir system as claimed in claim 12.

19. A fluid reservoir system for an apparatus, which the apparatus comprises a fluid system, the reservoir system comprising a container for fluid, in which the container comprises at least one fluid port, and in which, said at least one port comprises a self-sealing coupling that connects to a corresponding coupling on the apparatus to thereby connect said container in fluidic communication with the fluid system of the apparatus and in which the reservoir system comprises one or more latches that retains said container in fluidic communication with said apparatus fluid system and is remotely operable to disconnect said container from said apparatus fluid system and in which the reservoir system comprises at least one actuator which is connected to said one or more latches and that operates said one or more latches; said container is elongate; said at least one port is located at a first end of said container; and said at least one actuator is operable at a second end of said container distal from said at least one port.

20. A fluid reservoir system as claimed in claim 6 in which movement of said at least one actuator in a direction perpendicular to said second end of said container causes said single elongate member to act through said transverse actuator member on each of said one or more latches thereby operating each of said one or more latches and disconnecting said container from said fluid circulation system.

21. A fluid reservoir system for an apparatus, which the apparatus comprises a fluid circulation system, the reservoir system comprising a container for fluid, in which the container comprises at least one fluid inlet port, at least one fluid outlet port and at least one vent port and in which, each of said ports comprises a self-sealing coupling that connects to a corresponding coupling on the vehicle engine to thereby connect said container in fluidic communication with the fluid circulation system of the engine and in which the reservoir system comprises one or more latches that retains said container in fluidic communication with said vehicle engine fluid circulation system and is remotely operable to disconnect said container from said vehicle engine fluid circulation system and in which the reservoir system comprises at least one actuator which is connected to said one or more latches and that operates said one or more latches; said container is elongate; said inlet, outlet and vent ports are located at a common first end of said container and extend from said first end of said container in a respective direction; said at least one actuator is operable at a second end of said container, distal from said ports; and said at least one actuator extends from said second end of said container to said first end of said container in a second direction that is parallel to the respective directions of said inlet, outlet, and vent ports.

* * * * *